Dec. 30, 1941.  E. F. KELM  2,268,154
MANOMETER
Filed Dec. 16, 1939
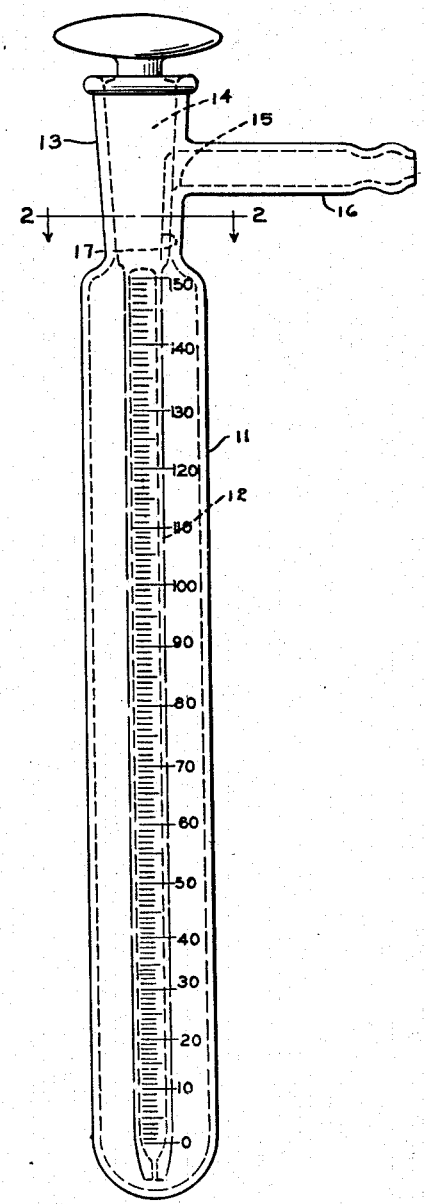
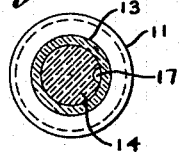
INVENTOR.
EVERETT F. KELM
BY
ATTORNEYS.

Patented Dec. 30, 1941

2,268,154

UNITED STATES PATENT OFFICE 2,268,154

MANOMETER

Everett F. Kelm, Corning, N. Y., assignor to Corning Glass Works, Corning, N. Y., a corporation of New York Application December 16, 1939, Serial No. 309,699

3 Claims. (Cl. 73—31)

My invention relates in general to laboratory apparatus and particularly to improvements in manometers of the closed type.

One object of my invention is a form of manometer which can be economically manufactured.

Another object is a manometer which can be easily filled.

Another object is a manometer which can be easily cleaned.

A still further object is a manometer having a valve built therein.

Fig. 1 of the accompanying drawing illustrates, in side elevation, a manometer embodying my invention; and Fig. 2 is a sectional view on line 2—2 of Fig. 1.

The manometer illustrated comprises but two parts, an outer container 11 and an inner container 12. The outer container is in the form of a bottle having a neck portion 13 ground to receive a ground stopper 14 which is made integral with the closed end of the inner container 12. The other end of container 12 has a constricted opening. The neck 13 has a side opening 15 surrounded by a laterally extending nipple 16 integral with the neck for connection with a vacuum line or the like.

The stopper 14 functions in the customary manner to seal the top opening of container 11. A vertical groove 17 in the side of the stopper establishes a path of communication between the neck opening 15 and the inside of container 11. By rotating the stopper relative to the container 11, this path may be closed.

To prepare the assembly for use, the inner container is held in an inverted position and filled with mercury. This can be quite readily done by drawing a rubber tube over the open end of the container and using such tube as a funnel. After the tube is filled, mercury is introduced into the outer container to such height that when the inner container is again placed within the outer container the open end of the inner container will be slightly submerged. The opening in the end of container 12 is constricted to such cross section that the introduction of the filled container 12 into mercury contained in the outer body 11 can be accomplished without loss of the mercury from the inner container.

In operation, any change of air pressure in the outer container, within the range of the instrument, will cause a readily noticeable change in mercury level in the inner container, the range of the instrument being determined by the length of the inner container. Owing to the constricted opening of container 12, sudden changes in pressure within chamber 11 cannot bring about a rapid change in the level of mercury in container 12. This is an important feature in that if no constriction is provided and a sudden increase in pressure occurs the mercury may raise in container 12 with such force as to break it or drive the stopper out of the container 11. The constriction prevents all danger of this occurring.

One of the containers, preferably container 12, is provided with a scale (not shown) for indicating the existing pressure in a connected line.

As will be apparent by simply turning the stopper, groove 16 can be brought out of register with the neck opening 15 and an established reading maintained after disconnection of apparatus from the manometer.

What is claimed is:

1. In a manometer, a transparent outer container open at one end and closed at the opposite end and having a side opening near its open end, and a transparent inner container having a constricted opening in one end and a closed opposite end equipped with a solid stopper for said first container, said stopper having a groove therein serving as a passage between the interior of said outer container and its opening.

2. In a manometer, a transparent outer container having a neck with top and side openings respectively and an oppositely disposed closed end, a transparent inner container having a constricted opening in one end which is arranged near the closed end of the outer container, said inner container having an oppositely disposed closed end equipped with a stopper which seats in and closes the top opening of the outer container, said stopper comprising a solid mass of glass having a groove therein extending from within the outer container to a height rendering it registerable with the side opening of said outer container.

3. In a manometer, a transparent closed bottom outer container having a tapered and surface ground top opening and a side opening, a transparent inner container having a constricted open end arranged near the bottom of the outer container and a closed end equipped with a tapered stopper ground to fit the top opening thereof, said stopper comprising a solid mass of glass having a groove therein extending from within the outer container to a height rendering it registerable with the side opening thereof.

EVERETT F. KELM.